United States Patent
Shen

(10) Patent No.: US 11,337,243 B2
(45) Date of Patent: May 17, 2022

(54) WIRELESS COMMUNICATION METHOD AND DEVICE FOR CONFIGURING AVAILABLE RESOURCES

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/860,750

(22) Filed: Apr. 28, 2020

(65) Prior Publication Data

US 2020/0260476 A1    Aug. 13, 2020

Related U.S. Application Data

(63) Continuation of application No. PCT/CN2017/109404, filed on Nov. 3, 2017.

(51) Int. Cl.
*H04W 72/12* (2009.01)

(52) U.S. Cl.
CPC .............. *H04W 72/1289* (2013.01)

(58) Field of Classification Search
CPC ......... H04W 72/1289; H04W 72/1278; H04W 72/12; H04W 72/1284; H04L 5/0053; H04L 5/0094; H04L 1/18; H04L 5/0091; H04L 1/003
See application file for complete search history.

(56) References Cited

U.S. PATENT DOCUMENTS

| 2015/0223254 A1 | 8/2015 | Guo et al. |
| 2017/0033901 A1 | 2/2017 | Tavildar et al. |
| 2018/0006791 A1 | 1/2018 | Marinier et al. |
| 2018/0020430 A1* | 1/2018 | Aiba .................... H04L 5/0057 |
| 2018/0115965 A1 | 4/2018 | Takeda et al. |

(Continued)

FOREIGN PATENT DOCUMENTS

| CN | 106162907 A | 11/2016 |
| EP | 3297353 A1 | 3/2018 |

(Continued)

OTHER PUBLICATIONS

International Search Report in the international application No. PCT/CN2017/109404, dated May 30, 2018.

(Continued)

*Primary Examiner* — Jackie Zuniga Abad
(74) *Attorney, Agent, or Firm* — Perkins Coie LLP

(57) ABSTRACT

Embodiments of the application provide a communication method in a wireless communication network. A device of the network determines K bits being used for indicating a resource index of a scheduling resource in downlink control information (DCI), wherein the K bits being used for indicating a resource set or a resource type or a channel format, that is corresponding to the scheduling resource, wherein K is an integer greater than or equal to 0, then the device determines the resource index indicated by K bits based on the K bits, and determines a scheduling resource from at least one available resource according to the determined resource index.

12 Claims, 3 Drawing Sheets

(56) References Cited

U.S. PATENT DOCUMENTS

| | | | |
|---|---|---|---|
| 2018/0146456 A1* | 5/2018 | Zhou | H04L 5/0053 |
| 2018/0176943 A1 | 6/2018 | Takeda et al. | |
| 2020/0235892 A1 | 7/2020 | Marinier et al. | |
| 2020/0351863 A1* | 11/2020 | Matsumura | H04B 1/713 |

FOREIGN PATENT DOCUMENTS

| | | |
|---|---|---|
| EP | 3316640 A1 | 5/2018 |
| JP | 6081531 B2 | 2/2017 |
| RU | 2481745 C2 | 5/2013 |
| WO | 2016123372 A1 | 8/2016 |
| WO | 2016163503 A1 | 10/2016 |
| WO | 2017000248 A1 | 1/2017 |
| WO | 2017023422 A1 | 2/2017 |

OTHER PUBLICATIONS

MCC Support, Final Report of 3GPP TSG RAN WG1 #90bis v1.0.0 (Prague, Czech Rep, Oct. 9-13, 2017), Approval, 3GPP TSG RAN WG1 Meeting #91 R1-1719301, Nov. 27-Dec. 1, 2017.

Written Opinion of the International Search Authority in the international application No. PCT/CN2017/109404, dated May 30, 2018.

NTT DOCOMO et al: "Resource allocation for PUCCH", 3GPP Draft: R1-1718214. 3rd Generation Partnership Project (3GPP), Mobile Competence Centre; 650, Route Des Lucioles: F-06921 Sophia-Antipolis Cedex France vol. RAN WG1, No. Prague, CZ; Oct. 9-13, 2017 Oct. 8, 2017 (Oct. 8, 2017), XP051341396, Retrieved from the Internet: URL: http://www.3gpp.org/ftp/Meetings_3GPP_SYNC/RAN1/Docs/, [retrieved on Oct. 8, 2017] * p. 6/3 ** 2.3 2.4 2.5 *.

OPPO: "Resource allocation for PUCCH", 3GPP Draft: R1-1718047, 3rd Generation Partnership Project (3GPP), Mobilecompetence Centre ; 650, Route Des Lucioles : F-06921 Sophia-Antipolis Cedex France vol. RAN WG1, No. Prague, CZ; Oct. 9-13, 2017 Oct. 8, 2017 (Oct. 8, 2017), XP051341229, Retrieved from the Internet: URL: http://www.3gpp.org/ftp/Meetings_3GPP_SYNC/RAN1/Docs/ [retrieved on Oct. 8, 2017] * the whole document *.

Supplementary European Search Report in the European application No. 17930692.3, dated Oct. 12, 2020.

First Office Action of the Russian application No. 2020117952, dated Feb. 26, 2021.

First Office Action of the European application No. 17930692.3, dated May 31, 2021. 5 pages.

Office Action of the Indian application No. 202027023132, dated Jul. 13, 2021. 8 pages with English translation.

Second Office Action of the Russian application No. 2020117952, dated Jul. 15, 2021. 7 pages with English translation.

First Office Action of the Canadian application No. 3080817, dated Jun. 4, 2021. 4 pages.

OPPO"Resource allocation for PUCCH"[online] and 3GPP TSG RAN WG1 #91R1-1719971,Internet<URL:http://www.3gpp.org/ftp/tsg_ran/WG1_RL1/TSGR1_91/Docs/R11719971.zip>,2017. 9 pages.

First Office Action of the Japanese application No. 2020-524285, dated Oct. 5, 2021. 8 pages with English translation.

Second Office Action of the European application No. 17930692.3, dated Nov. 29, 2021. 6 pages.

First Office Action of the Korean application No. 10-2020-7015826, dated Feb. 24, 2022. 9 pages with English translation.

* cited by examiner

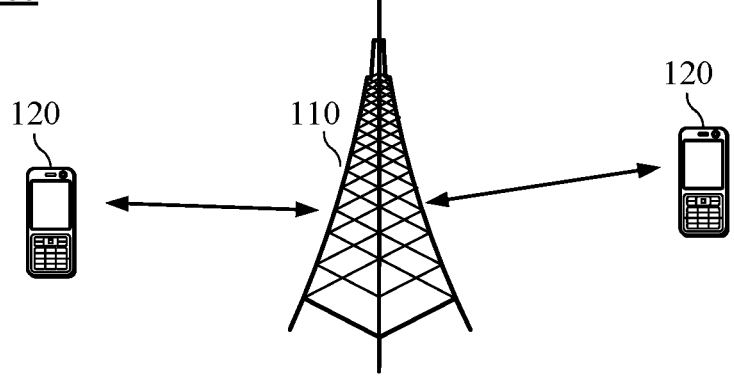

210 — a terminal device determines an indication format of multiple indicator bits in downlink control information (DCI) for indicating a resource index of a scheduling resource, the indication format being used for defining a number K of bits in the multiple indicator bits, the number K of bits being used for indicating a resource set or a resource type or a channel format, that is corresponding to the scheduling resource, where K is an integer greater than or equal to 0

220 — the terminal device determines, based on the determined indication format, the resource index indicated by the multiple indicator bits from the DCI; and 230 — the terminal device determines, according to the determined resource index, the scheduling resource for communicating with a network device from one or more available resources

FIG. 2

300 a network device determines an indication format of multiple indicator bits in DCI for indicating a resource index of a scheduling resource, the indication format being used for defining a number K of bits in the multiple indicator bits, the number K of bits being used for indicating a resource set or a resource type or a channel format, that is corresponding to the scheduling resource, and K is an integer greater than or equal to 0 — 310 the network device sends the DCI based on the determined indication format — 320

FIG. 3

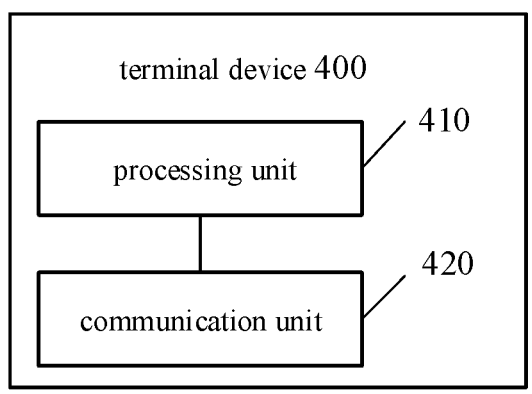

FIG. 4

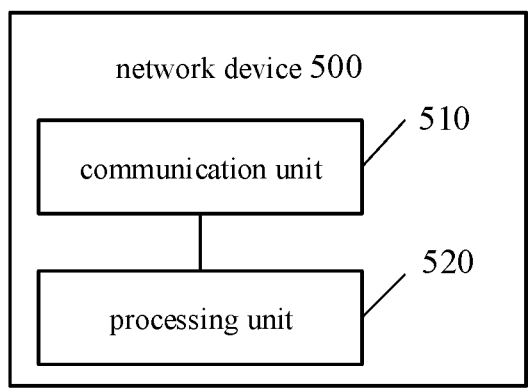

WIRELESS COMMUNICATION METHOD AND DEVICE FOR CONFIGURING AVAILABLE RESOURCES

CROSS-REFERENCE TO RELATED APPLICATIONS

This is a continuation application of International Patent Application No. PCT/CN2017/109404, filed on Nov. 3, 2017, the content of which are incorporated by reference herein in its entirety for all purposes.

TECHNICAL FIELD

The disclosure relates to the communication field, and specifically to a wireless communication method and device.

BACKGROUND

In a long term evolution (LTE) system, a terminal device may determine resources occupied by a physical uplink control channel (PUCCH) based on a specific timing relationship between the PUCCH and other channels when sending the PUCCH to a network device. However, transmitting the PUCCH in such a manner results in a low flexibility in resource usage.

A new radio (NR) system requires a high flexibility in the resource usage.

Therefore, improving the flexibility in the resource usage for channel transmission becomes a problem to be solved urgently.

BRIEF DESCRIPTION OF DRAWINGS

In order to describe the technical solutions of the embodiments of the disclosure more clearly, the drawings to be used for descriptions about the embodiments or the embodiments or a conventional art will be simply introduced below. Of course, the drawings described below are only some embodiments of the disclosure. For those skilled in the art, other drawings may further be obtained according to these drawings without creative work.

FIG. 1 is a schematic diagram illustrating a wireless communication system according to an embodiment of the disclosure.

FIG. 2 is a schematic flow chart illustrating a wireless communication method according to an embodiment of the disclosure.

FIG. 3 is a schematic flow chart illustrating a wireless communication method according to an embodiment of the disclosure.

FIG. 4 is a schematic flow chart illustrating a terminal device according to an embodiment of the disclosure.

FIG. 5 is a schematic flow chart illustrating a network device according to an embodiment of the disclosure.

DETAILED DESCRIPTION

Figure 6:
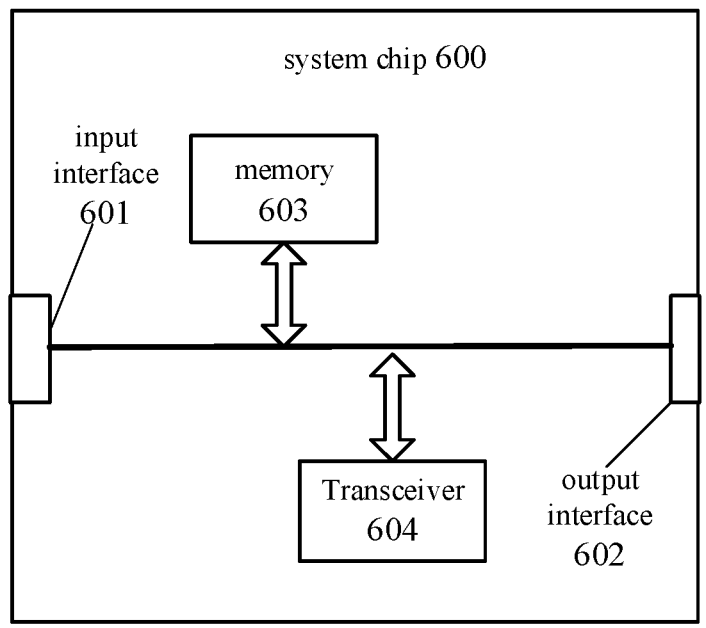
FIG. 6 is a schematic flow chart illustrating a system chip according to an embodiment of the disclosure.

The technical solutions in the embodiments of the disclosure will be clearly and completely described below in combination with the drawings in the embodiments of the disclosure. Of course, the described embodiments are not all embodiments but part of embodiments of the disclosure. All other embodiments obtained by those skilled in the art on the basis of the embodiments in the disclosure without creative work fall within the scope of protection of the disclosure.

The technical solutions of the embodiments of the application may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD) system, a Universal Mobile Telecommunication System (UMTS), a Worldwide Interoperability for Microwave Access (WiMAX) communication system or a future 5G system Embodiments of the disclosure provide a wireless communication method and device, which can improve the flexibility in resource usage for channel transmission.

A first aspect provides a wireless communication method, which includes:

determining, by a terminal device, an indication format of multiple indicator bits in downlink control information (DCI) for indicating a resource index of a scheduling resource, the indication format being used for defining a number K of bits in the multiple indicator bits, the number K of bits being used for indicating a resource set or a resource type or a channel format, that is corresponding to the scheduling resource, wherein K is an integer greater than or equal to 0;

determining, by the terminal device, based on the determined indication format, the resource index indicated by the multiple indicator bits from the DCI; and determining, by the terminal device, according to the determined resource index, the scheduling resource for communicating with a network device from one or more available resources.

In the embodiment of the disclosure, the terminal device determines the indication format of multiple indicator bits in the DCI for indicating the resource index of the scheduling resource, the indication format is used for defining the number K of bits in the multiple indicator bits, the number K of bits is used for indicating a resource set or a resource type or a channel format, that is corresponding to the scheduling resource, and K is an integer greater than or equal to 0. The terminal device determines, based on the determined indication format, the resource index indicated by the multiple indicator bits from the DCI, so that the terminal device can determine, according to the determined resource index, the scheduling resource for communicating with the network device from one or more available resources. Therefore, in the disclosure, variable DCI structures are used for scheduling the resources, and there is no need to limit the resources transmitted by the channel based on a specific resource type or a specific channel format, and instead, multiple definition modes and notification modes of the resource set can be used flexibly in light of application scenarios, to implement the flexible and variable DCI formats, and improve the flexibility and the reliability in indicating the resources.

In combination with the first aspect, in one possible implementation mode of the first aspect, K is greater than or equal to 1; the multiple indicator bits are composed of at least one first bit and at least one second bit; the first bit is used for indicating: an index of the resource set corresponding to the scheduling resource, an index of the resource type corresponding to the scheduling resource, or an index of the channel format corresponding to the scheduling resource; the second bit is used for indicating: an index of the scheduling resource in the corresponding resource set, an index of the scheduling resource in the corresponding resource set corresponding to the resource type, or an index of the scheduling resource in the corresponding resource set corresponding to the channel format; and the resource set includes at least one available resource.

In combination of the first aspect or any one of the above possible implementation mode, in another possible implementation mode of the first aspect, K is equal to 0, the multiple indicator bits are composed of a third bit which is used for indicating an index of the scheduling resource in all the available resources.

In combination of the first aspect or any one of the above possible implementation mode, in another possible implementation mode of the first aspect, the method further includes:

the terminal device receives first information, which is used for indicating the indication format, from the network device.

In combination of the first aspect or any one of the above possible implementation mode, in another possible implementation mode of the first aspect, the first information is carried in: a radio resource control (RRC) message, system information, or a broadcasting channel.

In combination of the first aspect or any one of the above possible implementation mode, in another possible implementation mode of the first aspect, the operation of determining, by the terminal device, the indication format of the multiple indicator bits in the DCI for indicating the resource index of the scheduling resource includes:

determining by the terminal device, the indication format in a manner for setting resource indexes of the available resources.

In combination of the first aspect or any one of the above possible implementation mode, in another possible implementation mode of the first aspect, when the resource indexes of the available resources are set according to at least two resource sets or at least two channel formats or at least two resource types respectively, K is greater than or equal to 1, and there is at least one same resource index among the resource indexes of the at least two resource sets or among the resource indexes of the at least two channel formats or among the resource indexes of the at least two resource types; or, when the resource indexes of the available resources are not set according to the at least two resource sets or the at least two channel formats or the at least two resource types respectively, K is equal to 0, and there are no same resource indexes in the available resources.

In combination of the first aspect or any one of the above possible implementation mode, in another possible implementation mode of the first aspect, determining, by the terminal device, the indication format of the multiple indicator bits in the DCI for indicating the resource index of the scheduling resource includes:

the terminal device determines the indication format according to a relation of numbers of the resources involved by at least two resource sets or at least two channel formats or at least two resource types.

In combination of the first aspect or any one of the above possible implementation mode, in another possible implementation mode of the first aspect, when numbers of the resources involved by the at least two resource sets or the at least two channel formats or the at least two resource types are same, K is greater than or equal to 1; or when the numbers of the resources involved by the at least two resource sets or the at least two channel formats or the at least two resource types are different from each other, K is equal to 0

In combination of the first aspect or any one of the above possible implementation mode, in another possible implementation mode of the first aspect, when each of the numbers of resources involved by the at least two resource sets or the at least two channel formats or the at least two resource types is no greater than $2^M/N$, K is greater than or equal to 1, and N is a number of the resource sets or the resource types or the channel formats, and M is a bit number of the multiple indicator bits; or when there is at least one resource set that involves more than $2^M/N$ resources in the at least two resource sets, or at least one channel format that involves more than $2^M/N$ resources in the at least two channel format, or at least one resource type that involves more than $2^M/N$ resources in the at least two resource types, K is equal to 0.

In combination of the first aspect or any one of the above possible implementation mode, in another possible implementation mode of the first aspect, the operation of determining, by the terminal device, the indication format according to the relation of numbers of the resources involved by the at least two resource sets of the available resources or the at least two channel formats of the available resources or the at least two resource types of the available resources includes:

determining, a number S of specific combinations of the at least two resource sets or the at least two channel formats or the at least two resource types, wherein the number of resources in the specific combination is no more than 2M/S, and M is a bit number of the multiple indicator bits; and determining K according to the number S.

In combination of the first aspect or any one of the above possible implementation mode, in another possible implementation mode of the first aspect, the at least two resource sets include a physical uplink control channel (PUCCH) resource set corresponding to format 0 and a PUCCH resource set corresponding to format 1; or the at least two resource sets include a PUCCH resource set corresponding to format 2, a PUCCH resource set corresponding to format 3 and a PUCCH resource set corresponding to format 4.

In combination of the first aspect or any one of the above possible implementation mode, in another possible implementation mode of the first aspect, the method further includes:

receiving, by the terminal device, second information from the network device, wherein the second information is used for configuring the available resources and one or more resource indexes, each corresponding to a respective one of the available resources.

In combination of the first aspect or any one of the above possible implementation mode, in another possible implementation mode of the first aspect, the second information is carried in: a RRC message, system information; or a broadcasting channel.

In combination of the first aspect or any one of the above possible implementation mode, in another possible implementation mode of the first aspect, the scheduling resource is: a PUCCH resource, a physical downlink shared channel (PDSCH) resource; or a physical uplink shared channel (PUSCH) resource.

A second aspect provides a wireless communication method, which includes:

determining, by a network device, an indication format of multiple indicator bits in downlink control information (DCI) for indicating a resource index of a scheduling resource, the indication format being used for defining a number K of bits in the multiple indicator bits, the number K of bits being used for indicating a resource set or a resource type or a channel format, that is corresponding to the scheduling resource, wherein K is an integer greater than or equal to 0; and sending, by the network device, the DCI based on the determined indication format.

In the embodiment of the disclosure, the network device determines the indication format of multiple indicator bits in the DCI for indicating the resource index of the scheduling resource, the indication format is used for defining the number K of bits in the multiple indicator bits, the number K of bits is used for indicating a resource set or a resource type or a channel format, that is corresponding to the scheduling resource, and K is an integer greater than or equal to 0. The network device sends the DCI based on the determined indication format. Therefore, in the disclosure, variable DCI structures are used for scheduling the resources, and there is no need to limit the resources transmitted by the channel based on a specific resource type or a specific channel format, and instead, multiple definition modes and notification modes of the resource set can be used flexibly in light of application scenarios, to implement the flexible and variable DCI formats, and improve the flexibility and the reliability in indicating the resources.

In combination of the second aspect, in one possible implementation mode of the second aspect, K is greater than or equal to 1; the multiple indicator bits are composed of at least one first bit and at least one second bit; the first bit is used for indicating: an index of the resource set corresponding to the scheduling resource, an index of the resource type corresponding to the scheduling resource, or an index of the channel format corresponding to the scheduling resource; the second bit is used for indicating: an index of the scheduling resource in the corresponding resource set, an index of the scheduling resource in the corresponding resource set corresponding to the resource type, or an index of the scheduling resource in the corresponding resource set corresponding to the channel format; and the resource set includes at least one available resource.

In combination of the second aspect or any one of the above possible implementation mode, in another possible implementation mode of the second aspect, K is equal to 0 and the multiple indicator bits are composed of a third bit which is used for indicating an index of the scheduling resource in all the available resources.

In combination of the second aspect or any one of the above possible implementation mode, in another possible implementation mode of the second aspect, the method further includes:

sending, by the network device, first information to a terminal device, wherein the first information is used for indicating the indication format.

In combination of the second aspect or any one of the above possible implementation mode, in another possible implementation mode of the second aspect, the first information is carried in: a radio resource control (RRC) message, system information, or a broadcasting channel.

In combination of the second aspect or any one of the above possible implementation mode, in another possible implementation mode of the second aspect, the indication corresponds to a manner for setting resource indexes of the available resources of the terminal device.

In combination of the second aspect or any one of the above possible implementation mode, in another possible implementation mode of the second aspect, when the resource indexes of the available resources are set according to at least two resource sets or at least two channel formats or at least two resource types respectively, K is greater than or equal to 1, and there is at least one same resource index among the resource indexes of the at least two resource sets or among the resource indexes of the at least two channel formats or among the resource indexes of the at least two resource types; or when the resource indexes of the available resources are not set according to the at least two resource sets or the at least two channel formats or the at least two resource types respectively, K is equal to 0, and there are no same resource indexes in the available resources.

In combination of the second aspect or any one of the above possible implementation mode, in another possible implementation mode of the second aspect, the indication format corresponds to the relation of numbers of the resources involved by the at least two resource sets of the available resources of the terminal device or the at least two channel formats of the available resources of the terminal device or the at least two resource types of the available resources of the terminal device.

In combination of the second aspect or any one of the above possible implementation mode, in another possible implementation mode of the second aspect, when numbers of the resources involved by the at least two resource sets or the at least two channel formats or the at least two resource types are same, K is greater than or equal to 1; or when the numbers of the resources involved by the at least two resource sets or the at least two channel formats or the at least two resource types are different from each other, K is equal to 0.

In combination of the second aspect or any one of the above possible implementation mode, in another possible implementation mode of the second aspect, when each of the numbers of resources involved by the at least two resource sets or the at least two channel formats or the at least two resource types is no greater than $2^M/N$, K is greater than or equal to 1, and N is a number of the resource sets or the resource types or the channel formats, and M is a bit number of the multiple indicator bits; or when there is at least one resource set that involves more than $2^M/N$ resources in the at least two resource sets, or at least one channel format that involves more than $2^M/N$ resources in the at least two channel format, or at least one resource type that involves more than $2^M/N$ resources in the at least two resource types, K is equal to 0.

In combination of the second aspect or any one of the above possible implementation mode, in another possible implementation mode of the second aspect, K corresponds to the number S;

the number S is a number of specific combinations of the at least two resource sets or the at least two channel formats or the at least two resource types; the number of resources in the specific combination is no more than $2^M/S$ and M is a bit number of the multiple indicator bits.

In combination of the second aspect or any one of the above possible implementation mode, in another possible implementation mode of the second aspect, the at least two resource sets include a PUCCH resource set corresponding to format 0 and a PUCCH resource set corresponding to format 1; or the at least two resource sets include a PUCCH resource set corresponding to format 2, a PUCCH resource set corresponding to format 3 and a PUCCH resource set corresponding to format 4.

In combination of the second aspect or any one of the above possible implementation mode, in another possible implementation mode of the second aspect, the method further includes:

sending, by the network device, second information to the terminal device, wherein the second information is used for configuring the available resources and one or more resource indexes, each corresponding to a respective one of the available resources.

In combination of the second aspect or any one of the above possible implementation mode, in another possible implementation mode of the second aspect, the second information is carried in: an RRC message, system information; or a broadcasting channel.

In combination of the second aspect or any one of the above possible implementation mode, in another possible implementation mode of the second aspect, the scheduling resource is: a PUCCH resource, a PDSCH resource, or a PUSCH resource.

A third aspect provides a terminal device, which is used to execute the method in the first aspect or any possible implementation mode of the first aspect. Specifically, the terminal device includes functional modules for executing the method in the first aspect or any possible implementation mode of the first aspect.

A fourth aspect provides a network device, which is used to execute the method in the second aspect or any possible implementation mode of the second aspect. Specifically, the network device includes functional modules for executing the method in the second aspect or any possible implementation mode of the second aspect.

A fifth aspect provides a terminal device, which includes a processor, a memory and a transceiver. The processor, the memory and the transceiver communicate with one another through an internal connecting path to transmit control and/or data signals to enable the terminal device to execute the method in the first aspect or any possible implementation mode of the first aspect.

A sixth aspect provides a terminal device, which includes a processor, a memory and a transceiver. The processor, the memory and the transceiver communicate with one another through an internal connecting path to transmit control and/or data signals to enable the network device to execute the method in the second aspect or any possible implementation mode of the second aspect.

A seventh aspect provides a computer-readable medium, which is configured to store a computer program, the computer program including an instruction configured to execute the method in each aspect or any possible implementation mode.

An eighth aspect provides a computer program product including an instruction, which runs on a computer to enable the computer to execute the method in each aspect or any possible implementation mode.

FIG. 1 illustrates a wireless communication system 100 to which the embodiments of the application are applied. The wireless communication system 100 may include a network device 110. The network device 110 may be a device communicating with a terminal device. The network device 110 may provide communication coverage for a specific geographical region and may communicate with a terminal device (for example, User Equipment (UE)) in the coverage. Optionally, the network device 100 may be a Base Transceiver Station (BTS) in the GSM or the CDMA system, or may be a NodeB (NB) in the WCDMA system, or may be an Evolutional Node B (eNB or eNodeB) in the LTE system or a wireless controller in a Cloud Radio Access Network (CRAN). Or, the network device may be a relay station, an access point, a vehicle-mounted device, a wearable device, a network-side device in a future 5G network, a network device in a future evolved Public Land Mobile Network (PLMN) or the like.

The wireless communication system 100 further includes at least one terminal device 120 within the coverage of the network device 110. The terminal device 120 may be mobile or stationary. Optionally, the terminal device 120 may be an access terminal, a UE, a user unit, a user station, a mobile station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

Optionally, the terminal device 120 may perform Device to Device (D2D) communication.

Optionally, the 5G system or network may also be called a New Radio (NR) system or network.

A network device and two terminal devices are exemplarily illustrated in FIG. 1. Optionally, the wireless communication system 100 may include multiple network devices, and another number of terminal devices may be included in coverage of each network device. There are no limits made thereto in the embodiments of the application.

Optionally, the wireless communication system 100 may further include another network entity such as a network controller and a mobility management entity. There are no limits made thereto in the embodiments of the application.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B, and independent existence of B. In addition, character "/" in the disclosure usually represents that previous and next associated objects form an "or" relationship.

FIG. 2 is a schematic flow chart illustrating a wireless communication method according to the embodiment of the disclosure. The method 200 may optionally be applied to, but not limited to, the system illustrated by FIG. 1. The method may be executed by the terminal device. The method 200 includes at least a part of the following contents.

In 210, a terminal device determines an indication format of multiple indicator bits in downlink control information (DCI) for indicating a resource index of a scheduling resource, and the indication format is used for defining a number K of bits in the multiple indicator bits, the number K of bits is used for indicating a resource set or a resource type or a channel format, that is corresponding to the scheduling resource, where K is an integer greater than or equal to 0.

Specifically, the terminal device may support the DCI with multiple indication formats, and may determine the indication format of the DCI, which has been received or will be received, from the multiple indicator bits. Since the indication format defines the number K of bits, which are used for indicating the resource set, the resource type or the channel format, each of which corresponds to the scheduling resource, in the multiple indicator bits, the terminal device may get the number K of bits, which are used for indicating the resource set, the resource type or the channel format, each of which corresponds to the scheduling resource, in the multiple indicator bits, and thus the K bits in the multiple indicator bits may be used for determining the resource set, the resource type or the channel format, each of which corresponds to the scheduling resource.

If it is the resource set that is determined, the scheduling resource may be determined from the determined resource set; if it is the resource type that is determined, the scheduling resource may be determined from the resource set corresponding to the determined resource type; if it is the channel format that is determined, the scheduling resource may be determined from the resource set corresponding to the determined channel format.

Alternatively, the location of the K bits, which indicate the resource set, the resource type or the channel format, in the multiple indicator bits may be fixed. For example, the K bits may be first K bits in the multiple indicator bits, or last K bits in the multiple indicator bits or K bits in the middle part of the multiple indicator bits.

Alternatively, K is greater than or equal to 1; the multiple indicator bits are composed of at least one first bit and at least one second bit. The first bit is used for indicating: an index of the resource set corresponding to the scheduling resource, an index of the resource type corresponding to the scheduling resource, or an index of the channel format corresponding to the scheduling resource. The second bit is used for indicating: an index of the scheduling resource in the corresponding resource set, an index of the scheduling resource in the corresponding resource set corresponding to the resource type, or an index of the scheduling resource in the corresponding resource set corresponding to the channel format. The resource set includes at least one available resource.

For example, there are 3 indicator bits, and the first bit is used for indicating: an index of the resource set corresponding to the scheduling resource, an index of the resource type corresponding to the scheduling resource, or an index of the channel format corresponding to the scheduling resource. For example, a bit value 0 indicates that the resource set corresponding to the scheduling resource is resource set 1, or the resource type corresponding to the scheduling resource is resource type 1, or the channel format corresponding to the scheduling resource is channel format 1; and a bit value 1 indicates that the resource set corresponding to the scheduling resource is resource set 2, or the resource type corresponding to the scheduling resource is resource type 2, or the channel format corresponding to the scheduling resource is channel format 2; The second and the third bit are used for indicating: the resource set indicated by the first bit, the resource set corresponding to the channel format indicated by the first bit, or the resource index in the resource set corresponding to the resource type indicated by the first bit. Four available resources may exist for each resource set, resource type or channel format respectively, and the index of each of the four available resources may be unique to its resource set, channel format or resource set. For example, the indexes of the four available resources may be 00, 01, 10 and 11 respectively. For each of the four available resources, a same index may be used in two resource sets, two channel formats or two resource types. For example, the indexes of the four available resources corresponding to each of two resource sets, two channel formats or two resource types are 00, 01, 10 and 11 respectively.

Alternatively, K is equal to 0, and the multiple indicator bits are composed of a third bit, which is used for indicating an index of the scheduling resource in all the available resources.

For example, all the available resources include 8 available resources, which may be indicated by the third bit. At this time, the available resources may not be distinguished from each other in terms of the resource type, channel format or resource set.

For better understanding of the disclosure, several modes in which the terminal device determines the indication format will be introduced as follows.

In one implementation mode, the terminal device receives first information, which is used for indicating the indication format, from a network device. A number of bits occupied by the first information is related to a number of the indication formats.

Specifically, the network device may indicate the indication format of the DCI of the terminal device via the first information. For example, assuming that K has a value 0 or 1, 1-bit information may be adopted to indicate the format of the DCI of the terminal device; assuming that K has a value of: 0, 1, 2 or 3, 2-bit information may be adopted to indicate the format of the DCI of the terminal device.

Alternatively, the first information is carried in: a radio resource control (RRC) message, system information, or a broadcasting channel.

In one implementation mode, the terminal device determines the indication format in a manner for setting resource indexes of the available resources.

Alternatively, when the resource indexes of the available resources are set according to at least two resource sets or at least two channel formats or at least two resource types respectively, K is greater than or equal to 1, and there is at least one same resource index among the resource indexes of the at least two resource sets or among the resource indexes of the at least two channel formats or among the resource indexes of the at least two resource types.

Alternatively, when the resource indexes of the available resources are not set according to the at least two resource sets or the at least two channel formats or the at least two resource types respectively, K is equal to 0, and there are no same resource indexes in the available resources.

Specifically, the terminal device may receive second information from the network device, and the second information is used for configuring the available resources and one or more resource indexes, each corresponding to a respective one of the available resources. When the terminal device determines that the resource indexes of the available resources are set according to at least two resource sets or at least two channel formats or at least two resource types respectively, for example, the indexes of the resource set 1 are 00, 01, 10 and 11 respectively, and the indexes of the resource set 2 are 00, 01, 10 and 11 respectively, it indicates that K is greater than or equal to 1. The value of K may be related to a number of the resource sets or the channel formats or resource types. For example, if the indexes are set according to 4 resource sets or 4 channel formats or 4 resource types, then the value of K may be 2. When the terminal device determines that the resource indexes of the available resources are not set according to the at least two resource sets or the at least two channel formats or the at least two resource types respectively, for example, the indexes of the resources are 000, 001, 010, 011, 100, 101, 110 and 111 respectively, which indicates K is equal to 0.

Alternatively, in the embodiment of the disclosure, the second information is carried in an RRC signaling, system information or a broadcasting message.

In one implementation mode, the terminal device determines the indication format according to a relation of numbers of the resources involved by at least two resource sets or at least two channel formats or at least two resource types.

Specifically, the terminal device may determine the indication format from the multiple indication formats according to the relation of the numbers of the resources involved by at least two resource sets or at least two channel formats or at least two resource types.

Alternatively, when a difference between the numbers of the resources involved by the at least two resource sets or the at least two channel formats or the at least two resource types is less than or equal to a specific value, K is greater than or equal to 1.

Alternatively, when the difference between the numbers of the resources involved by the at least two resource sets or the at least two channel formats or the at least two resource types is greater than the specific value, K is equal to 0.

Specifically, the terminal device may judge whether the difference between the numbers of the resources involved by the at least two resource sets or the at least two channel formats or the at least two resource types is less than a specific value. The specific value may be 0, which means judging whether the numbers of the resources involved by the at least two resource sets or the at least two channel formats or the at least two resource types are same.

If the numbers of the resources involved by the at least two resource sets or the at least two channel formats or the at least two resource types are same, then K is greater than or equal to 1, where the value of K may be fixed, for example the value of K may be equal to 1, or may be related to the number of the resource sets or the channel formats or resource types. For example, the number of the resource sets or the channel formats or the resource types may be equal to $2^K$. If the numbers of the resources involved by the at least two resource sets or the at least two channel formats or the at least two resource types are different from each other, K is equal to 0.

When K is greater than or equal to 1, the index of the resources of each resource set or the resources of each resource type or the resources of each channel format may be set in advance, or may be configured for the terminal device by the network device, or may be set by the terminal device iper se.

For example, if the network device configures the indexes of all the available resources, and the indexes do not overlap with each other, the terminal device, when determining that K is greater than or equal to 1, may re-determine the indexes of the resources of each resource set or the resources of each resource type or the resources of each channel format. For example, the terminal device may re-arrange the indexes of, the resources of the set or the resources of the resource type or the resources of the channel format by starting from 0, in an order of the indexes of the resources of each set or the resources of each resource type or the resources of each channel format in the available resources.

For example, if the network device configures the indexes for each resource set or each resource type or each channel format respectively and the indexes are overlapping, then the terminal device may re-determine the indexes of all the resources when determining that K is equal to 0. For example, the terminal device may re-arrange the indexes of the resources of the resource set or the resource type or the channel format in all the available resources by starting from 0, in an order of the indexes of the resources of each resource set or the resources of each resource type or the resources of each channel format in the set where the resource is.

Alternatively, when each of the numbers of resources involved by the at least two resource sets or the at least two channel formats or the at least two resource types is no greater than $2^M/N$, K is greater than or equal to 1, N is a number of the resource sets or the resource types or the channel formats, and M is a bit number of the multiple indicator bits; or, $2^M/N$ means each resource set or each resource type or each channel format.

Alternatively, when there is at least one resource set that involves more than $2^M/N$ resources in the at least two resource sets, or at least one channel format that involves more than $2^M/N$ resources in the at least two channel format, or at least one resource type that involves more than $2^M/N$ resources in the at least two resource types, K is equal to 0.

Specifically, when the number of the resource sets or the resource types or the channel formats is N, the number of indicator bits is M and the number of the resources of each resource set or each channel format or each resource type is no greater than $2^M/N$, it means that in the case of indicating the resource sets or the resource types or the channel formats and indicating the resources of the resource set or the resources of the resource type or the resources of the channel format, each resource may be indicated in a rational way. When the number of the resources of the resource set or the resources of the channel format or the resources of the resource type is more than $2^M/N$, it means that in the case of indicating the resource sets or the resource types or the channel formats and indicating the resources of the resource set or the resources of the resource type or the resources of the channel format, some resources may not be indicated.

Alternatively, a number S of specific combinations of the at least two resource sets or the at least two channel formats or the at least two resource types is determined, the number of resources in the specific combinations is no more than $2^M/S$, M is a bit number of the multiple indicator bits; and K is determined according to the number S.

Specifically, the terminal device may combine the resource sets or the channel formats or the resource types according to the number of the resources of each resource set or each channel format or each resource type; the resource sets or the channel formats or the resource types may be combined if the number of the resources in each combination is no greater than $2^M/S$; the resource sets or the channel formats or the resource types do not have to be combined if the number of the resources in each combination is no greater than $2^M/S$. If the number of the combinations is S, K may be determined, where the determined K meets that $2^K$ is greater than or equal to S.

Alternatively, the at least two resource sets include a physical uplink control channel (PUCCH) resource set corresponding to format 0 and a PUCCH resource set corresponding to format 1.

Alternatively, the at least two resource sets include a PUCCH resource set corresponding to format 2, a PUCCH resource set corresponding to format 3 and a PUCCH resource set corresponding to format 4.

Alternatively, the resource types in the embodiment of the disclosure may be classified based on the following modes.

In one implementation mode, the resource types may be classified based on lengths of symbols occupied by the carried channels. For example, the resource types may be classified into resources for carrying the long PUCCH and resources for carrying the short PUCCH.

In one implementation mode, the resource types may be classified based on loads of carried channels. For example, the resource types may be classified into resources which carry the PUCCH of the heavy loads such as the loads greater than or equal to 4 bits and resources which carry the PUCCH of the light loads such as the loads less than 4 bits.

In one implementation mode, the resource types may be classified based on granularities of time scheduling units of the carried channels. For example, the resource types may be classified into the resources carrying the channels based on slot scheduling and the resources carrying the channels based on non-slot scheduling.

Alternatively, the available resources or the scheduling resources mentioned in the embodiment of the disclosure is: a PUCCH resource, a physical downlink shared channel (PDSCH) resource, or a physical uplink shared channel (PUSCH) resource.

Alternatively, in the embodiment of the disclosure, when K is greater than or equal to 1, it means that the resources may be indicated in groups, and ordered indication of the resources may be implemented.

Alternatively, when K is equal to 0, problems of a high signaling cost or a situation that the resources cannot be indicated completely brought by differences in the numbers of the resources between the respective resource sets, or the respective resource types or the respective channel formats can be avoided.

In 220, the terminal device determines the resource index indicated by the multiple indicator bits from the DCI, based on the determined indication format.

In 230, the terminal device determines, according to the determined resource index, the scheduling resource for communicating with a network device from one or more available resources.

In the embodiment of the disclosure, the terminal device determines the indication format of multiple indicator bits in the DCI for indicating the resource index of the scheduling resource, the indication format is used for defining the number K of bits in the multiple indicator bits for indicating a resource set or a resource type or a channel format, that is corresponding to the scheduling resource, and K is an integer greater than or equal to 0. The terminal device determines, based on the determined indication format, the resource index indicated by the multiple indicator bits from the DCI, so that the terminal device can determine, according to the determined resource index, the scheduling resource for communicating with the network device from one or more available resources. Therefore, in the disclosure, variable DCI structures are used for scheduling the resources, and there is no need to limit the resources transmitted by the channel based on a specific resource type or a specific channel format, and instead, multiple definition modes and notification modes of the resource set can be used flexibly in light of application scenarios, to implement the flexible and variable DCI formats, and improve the flexibility and the reliability in indicating the resources.

FIG. 3 is a schematic flow chart illustrating a wireless communication method 300 according to an embodiment of the disclosure. As illustrated by the FIG. 3, the method 300 includes at least a part of the following contents.

In 310, a network device determines an indication format of multiple indicator bits in DCI for indicating a resource index of a scheduling resource, and the indication format is used for defining a number K of bits in the multiple indicator bits for indicating a resource set or a resource type or a channel format, that is corresponding to the scheduling resource, and K is an integer greater than or equal to 0.

In 320, the network device sends the DCI based on the determined indication format.

Alternatively, K is greater than or equal to 1. The multiple indicator bits are composed of at least one first bit and at least one second bit. The first bit is used for indicating: an index of the resource set corresponding to the scheduling resource, an index of the resource type corresponding to the scheduling resource, or an index of the channel format corresponding to the scheduling resource. The second bit is used for indicating: an index of the scheduling resource in the corresponding resource set, an index of the scheduling resource in the corresponding resource set corresponding to the resource type, or an index of the scheduling resource in the corresponding resource set corresponding to the channel format. The resource set includes at least one available resource.

Alternatively, K is equal to 0, and the multiple indicator bits are composed of a third bit, which is used for indicating an index of the scheduling resource in all the available resources.

Alternatively, the network device sends first information to the terminal device, the first information is used for indicating the indication format.

Alternatively, the first information is carried in an RRC message or system information or a broadcasting channel.

Alternatively, the indication format corresponds to a manner for setting resource indexes of the available resources of the terminal device.

Specifically, the network device may determine the manner for setting the resource indexes of the available resources, and then determine the format of the DCI based on the determined manner; or, the network device may determine the format of the DCI, and then determine the manner for setting the resource indexes of the available resources based on the format of the DCI.

Alternatively, when the resource indexes of the available resources are set according to at least two resource sets or at least two channel formats or at least two resource types respectively, K is greater than or equal to 1, and there is at least one same resource index among the resource indexes of the at least two resource sets or among the resource indexes of the at least two channel formats or among the resource indexes of the at least two resource types.

Alternatively, when the resource indexes of the available resources are not set according to the at least two resource sets or the at least two channel formats or the at least two resource types respectively, K is equal to 0, and there are no same resource indexes in the available resources.

Alternatively, the indication format corresponds to the relation of numbers of the resources involved by the at least two resource sets of the available resources of the terminal device or the at least two channel formats of the available resources of the terminal device or the at least two resource types of the available resources of the terminal device.

Specifically, the network device may determine the relation of numbers of the resources involved by the at least two resource sets or the at least two channel formats or the at least two resource types, and then determine the format of the DCI based on the determined relation of the numbers, or the network device may determine the format of the DCI, and then set the number of the resources involved by the at least two resource sets or the at least two channel formats or the at least two resource types, based on the format of the DCI.

Alternatively, when numbers of the resources involved by the at least two resource sets or the at least two channel formats or the at least two resource types are same, K is greater than or equal to 1.

Or, when the numbers of the resources involved by the at least two resource sets or the at least two channel formats or the at least two resource types are different from each other, K is equal to 0.

Alternatively, when each of the numbers of resources involved by the at least two resource sets or the at least two channel formats or the at least two resource types is no greater than $2^M/N$, K is greater than or equal to 1, and N is a number of the resource sets or the resource types or the channel formats, and M is a bit number of the multiple indicator bits.

Or, when there is at least one resource set that involves more than $2^M/N$ resources in the at least two resource sets, or at least one channel format that involves more than $2^M/N$ resources in the at least two channel format, or at least one resource type that involves more than $2^M/N$ resources in the at least two resource types, K is equal to 0.

Alternatively, K corresponds to the number S.

The number S is a number of specific combinations of the at least two resource sets or the at least two channel formats or the at least two resource types; the number of resources in the specific combination is no more than $2^M/S$, and M is a bit number of the multiple indicator bits.

Alternatively, the at least two resource sets include a PUCCH resource set corresponding to format 0 and a PUCCH resource set corresponding to format 1.

Or, the at least two resource sets include a PUCCH resource set corresponding to format 2, a PUCCH resource set corresponding to format 3, and a PUCCH resource set corresponding to format 4.

Alternatively, the network device sends second information to the terminal device, and the second information is used for configuring the available resources and one or more resource indexes, each corresponding to a respective one of the available resources.

Alternatively, the second information is carried in an RRC message, system information or a broadcasting channel.

Alternatively, the scheduling resource is a PUCCH resource, a PDSCH resource, or a PUSCH resource.

In the embodiment of the disclosure, the terminal device determines the indication format of multiple indicator bits in the DCI for indicating the resource index of the scheduling resource, the indication format is used for defining the number K of bits in the multiple indicator bits for indicating a resource set or a resource type or a channel format, that is corresponding to the scheduling resource, and K is an integer greater than or equal to 0. The terminal device determines, based on the determined indication format, the resource index indicated by the multiple indicator bits from the DCI, so that the terminal device can determine, according to the determined resource index, the scheduling resource for communicating with the network device from one or more available resources. Therefore, in the disclosure, variable DCI structures are used for scheduling the resources, and there is no need to limit the resources transmitted by the channel based on a specific resource type or a specific channel format, and instead, multiple definition modes and notification modes of the resource set can be used flexibly in light of application scenarios, to implement the flexible and variable DCI formats, and improve the flexibility and the reliability in indicating the resources.

FIG. 4 is a schematic flow chart illustrating a terminal device 400 according to an embodiment of the disclosure. As illustrated by the FIG. 4, the terminal device 400 includes a processing unit 410 and a 420. The processing unit 410 is configured to determine an indication format of multiple indicator bits in DCI for indicating a resource index of a scheduling resource, the indication format being used for defining a number K of bits, in the multiple indicator bits, for indicating a resource set or a resource type or a channel format, that is corresponding to the scheduling resource, and K is an integer greater than or equal to 0. The communication unit 420 is configured to receive the DCI from the network device. The processing unit 410 is further configured to determine, based on the determined indication format, the resource index indicated by the multiple indicator bits from the DCI, and determine the scheduling resource for communicating with a network device from one or more available resources according to the determined resource index.

It should be understood that, the terminal device 400 may correspond to the terminal device in the method embodiments, and may implement corresponding operations implemented by the terminal device in the method embodiments. For simplicity, the operations will not be elaborated herein.

FIG. 5 is a schematic flow chart illustrating a network device 500 according to an embodiment of the disclosure. As illustrated by FIG. 5, the network device 500 includes a communication unit 510 and a processing unit 520. The processing unit 520 is configured to determine an indication format of multiple indicator bits in DCI for indicating a resource index of a scheduling resource, the indication format being used for defining a number K of bits, in the multiple indicator bits, for indicating a resource set or a resource type or a channel format, that is corresponding to the scheduling resource, and K is an integer greater than or equal to 0. The communication unit 510 is configured to send the DCI based on the determined indication format.

It should be understood that, the network device 500 may correspond to the network device in the method embodiment, and may implement corresponding operations implemented by the terminal device in the method embodiments. For simplicity, the operations will not be elaborated herein.

FIG. 6 is a schematic structure diagram of a system chip 600 according to an embodiment of the application. The system chip 600 of FIG. 6 includes an input interface 601, an output interface 602, a processor 603 and a memory 604, which may be connected through an internal communication connecting line. The processor 603 is configured to execute a code in the memory 604.

Optionally, the code, when executed, causes the processor 603 to implement the method executed by the network device in the method embodiments. For simplicity, the method will not be elaborated herein.

Optionally, the code, when executed, causes the processor 603 to implement the method executed by the terminal device in the method embodiment. For simplicity, the method will not be elaborated herein.

Figure 7:
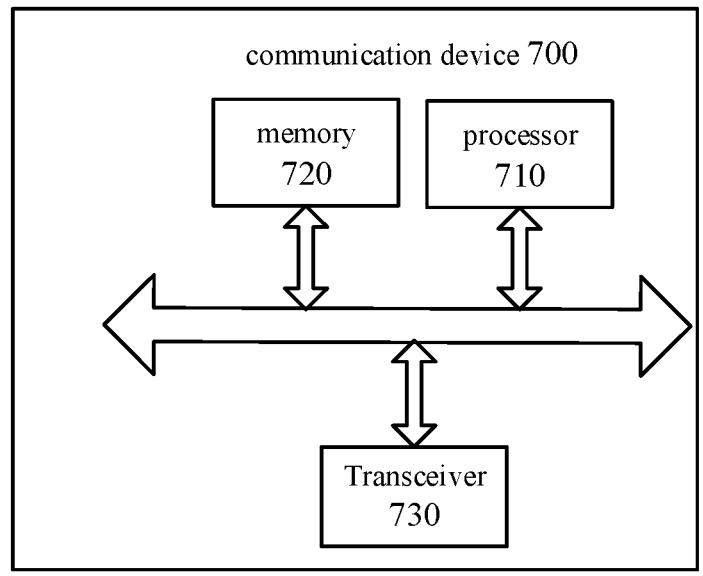
FIG. 7 is a schematic flow chart illustrating a communication device according to an embodiment of the disclosure.

FIG. 7 is a schematic block diagram of a communication device 700 according to an embodiment of the application. As illustrated in FIG. 7, the communication device 700 includes a processor 710 and a memory 720. Herein, the memory 720 may store a program code, and the processor 710 may execute the program code stored in the memory 720.

Optionally, as illustrated in FIG. 7, the communication device 700 may include a transceiver 730, and the processor 710 may control the transceiver 730 for external communication.

Optionally, the processor 710 may call the program code stored in the memory 720 to execute corresponding operations of the network device in the method embodiments. For similarity, the operations will not be elaborated herein.

Optionally, the processor 710 may call the program code stored in the memory 720 to execute corresponding operations of the terminal device in the method embodiments. For similarity, the operations will not be elaborated herein.

It should be understood that, the processor in the embodiment of the disclosure may be an integrated circuit chip with a signal processing capability. In an implementation process, each operation of the method embodiments may be completed by a hardware integrated logical circuit or software instructions in the processor. The processor may be a universal processor, a Digital Signal Processor (DSP), an Application Specific Integrated Circuit (ASIC), a Field Programmable Gate Array (FPGA) or another programmable logical device, a discrete gate or a transistor logical device and a discrete hardware component. Each method, operation and logical block diagram disclosed in the embodiments of the disclosure may be implemented or executed. The universal processor may be a microprocessor, or the processor may be any conventional processor and the like. The operations of the methods disclosed in combination with the embodiments of the disclosure may be directly executed by a hardware decoding processor, or executed by a combination of hardware and software modules in the decoding processor. The software module may be located in a storage medium known in the art, such as a Random Access Memory (RAM), a flash memory, a Read-Only Memory (ROM), a Programmable ROM (PROM), an Electrically Erasable PROM (EEPROM), or a register. The storage medium is located in a memory, and the processor reads information in the memory, and completes the operations of the methods in combination with hardware.

It can be understood that, the memory in the embodiment of the disclosure may be a volatile memory or a nonvolatile memory, or may include both the volatile and nonvolatile memories. The nonvolatile memory may be a read only memory (ROM), a programmable ROM (PROM), an Erasable PROM (EPROM), an electrically EPROM (EEPROM), or a flash memory. The volatile memory may be a random access memory (RAM), and is used as an external high-speed cache. As an exemplary but unlimited description, RAMs in various forms may be adopted, such as a Static RAM (SRAM), a Dynamic RAM (DRAM), a Synchronous DRAM (SDRAM), a Double Data Rate SDRAM (DDRS-DRAM), an Enhanced SDRAM (ESDRAM), a Synchlink DRAM (SLDRAM), and a Direct Rambus RAM (DR RAM). It is to be noted that the memory of a system and method described in the disclosure is intended to include, but not limited to, memories of these and any other proper types.

Those skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solution. Those skilled in the art may realize the described functions for each specific application by virtue of different methods, but such realization shall fall within the scope of the disclosure.

Those skilled in the art may clearly understand that for convenient and brief description, specific working processes of the system, devices and units described above may be seen from the corresponding processes in the method embodiments, and will not be elaborated herein.

In some embodiments provided by the disclosure, it is to be understood that the disclosed system, devices and methods may be implemented in another manner. The device embodiments described above are merely schematic, and for example, division of the units is only logic function division, and other division manners may be adopted during practical implementation. For example, multiple units or components may be combined or integrated into another system, or some characteristics may be omitted or may not be executed. In addition, coupling or direct coupling or communication connection between the illustrated or discussed components may be indirect coupling or communication connection of the device or the units through some interfaces, and may be in electrical and mechanical or other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to a conventional art may be embodied in form of software product, and the computer software product is stored in a storage medium, including a plurality of instructions configured to enable a piece of computer device (which may be a personal computer, a server, network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A wireless communication method in a wireless communication network, comprising:

determining, by a device of the network, an indication format of multiple indicator bits in downlink control information (DCI) for indicating a resource index of a scheduling resource, the indication format being used for defining K bits in the multiple indicator bits, the K bits being used for indicating a channel format that is corresponding to the scheduling resource, wherein K is an integer greater than or equal to 0;

determining, by the device of the network, based on the determined indication format, the resource index indicated by the multiple indicator bits from the DCI;

determining, by the device of the network, according to the determined resource index, the scheduling resource for communicating with a network device from at least two available resources; and receiving, by the device of the network, second information, wherein the second information is used for configuring an available resource of the at least two available resources and a corresponding resource index corresponding to the available resource;

wherein the at least two available resources comprise one available resource comprised in a resource set corresponding to format 0 or format 1, and another available resource comprised in a resource set corresponding to format 2, format 3 or format 4.

2. The method according to claim 1, wherein the second information is carried in:
   a radio resource control (RRC) message;
   system information; or
   a broadcasting channel.

3. The method according to claim 1, wherein the scheduling resource is:
   a physical uplink control channel (PUCCH) resource;
   a physical downlink shared channel (PDSCH) resource; or
   a physical uplink shared channel (PUSCH) resource.

4. The method according to claim 1, wherein the K bits are composed of at least one first bit and at least one second bit; the first bit is used for indicating:
   an index of the resource set corresponding to the scheduling resource;
   an index of the resource type corresponding to the scheduling resource; or,
   an index of the channel format corresponding to the scheduling resource,
   wherein the second bit is used for indicating:
      an index of the scheduling resource in the corresponding resource set;
      an index of the scheduling resource in the corresponding resource set corresponding to the resource type; or
      an index of the scheduling resource in the corresponding resource set corresponding to the channel format; and
   wherein the corresponding resource set comprises the at least one available resource.

5. An apparatus in a communication device, comprising:
a processor and a memory storing program instructions;
wherein when the program instructions are executed by the processor, the apparatus is configured to:
   determine an indication format of multiple indicator bits in downlink control information (DCI) for indicating a resource index of a scheduling resource, the indication format being used for defining K bits in the multiple indicator bits, the K bits being used for indicating a channel format that is corresponding to the scheduling resource, wherein K is an integer greater than or equal to 0;
   determine based on the determined indication format, the resource index indicated by the multiple indicator bits from the DCI;
   determine according to the determined resource index, the scheduling resource for communicating with a network device from at least two available resources; and
   receive second information, wherein the second information is used for configuring an available resource of the at least two available resources and a corresponding resource index corresponding to the available resource;

wherein the at least two available resources comprise one available resource comprised in a resource set corresponding to format 0 or format 1, and another available resource comprised in a resource set corresponding to format 2, format 3 or format 4.

6. The apparatus according to claim 5, wherein the second information is carried in:
   a radio resource control (RRC) message;
   system information; or
   a broadcasting channel.

7. The apparatus according to claim 5, wherein the scheduling resource is:
   a physical uplink control channel (PUCCH) resource;
   a physical downlink shared channel (PDSCH) resource; or
   a physical uplink shared channel (PUSCH) resource.

8. The apparatus according to claim 5, wherein the K bits are composed of at least one first bit and at least one second bit; the first bit is used for indicating:
   an index of the resource set corresponding to the scheduling resource;
   an index of the resource type corresponding to the scheduling resource; or,
   an index of the channel format corresponding to the scheduling resource,
   wherein the second bit is used for indicating:
      an index of the scheduling resource in the corresponding resource set;
      an index of the scheduling resource in the corresponding resource set corresponding to the resource type; or
      an index of the scheduling resource in the corresponding resource set corresponding to the channel format; and
   wherein the resource set comprises the at least one available resource.

9. The apparatus according to claim 5, wherein the apparatus is a microchip, and the communication device is a base station or a user terminal.

10. A non-transitory computer readable medium storing program codes thereon for execution by a processor in a communication device, wherein the program codes comprise instructions for:
   determining an indication format of multiple indicator bits in downlink control information (DCI) for indicating a resource index of a scheduling resource, the indication format being used for defining K bits in the multiple indicator bits, the K bits being used for indicating a channel format that is corresponding to the scheduling resource, wherein K is an integer greater than or equal to 0;
   determining based on the determined indication format, the resource index indicated by the multiple indicator bits from the DCI;
   determining according to the determined resource index, the scheduling resource for communicating with a network device from at least two available resources; and
   receiving second information, wherein the second information is used for configuring an available resource of the at least two available resources and a corresponding resource index corresponding to the available resource;

wherein the at least two available resources comprise one available resource comprised in a resource set corresponding to format 0 or format 1,
and
another available resource comprised in a resource set corresponding to format 2, format 3 or format 4.

11. The non-transitory computer readable medium according to claim 10, wherein the second information is carried in:
a radio resource control (RRC) message;
system information; or
a broadcasting channel.

12. The non-transitory computer readable medium according to claim 10, wherein the second information is carried in:
a physical uplink control channel (PUCCH) resource;
a physical downlink shared channel (PDSCH) resource; or
a physical uplink shared channel (PUSCH) resource.

* * * * *